O. W. PETERSON.
ACETYLENE GAS GENERATOR.
APPLICATION FILED FEB. 2, 1907. RENEWED JUNE 16, 1909.
945,588.
Patented Jan. 4, 1910.
3 SHEETS—SHEET 1.
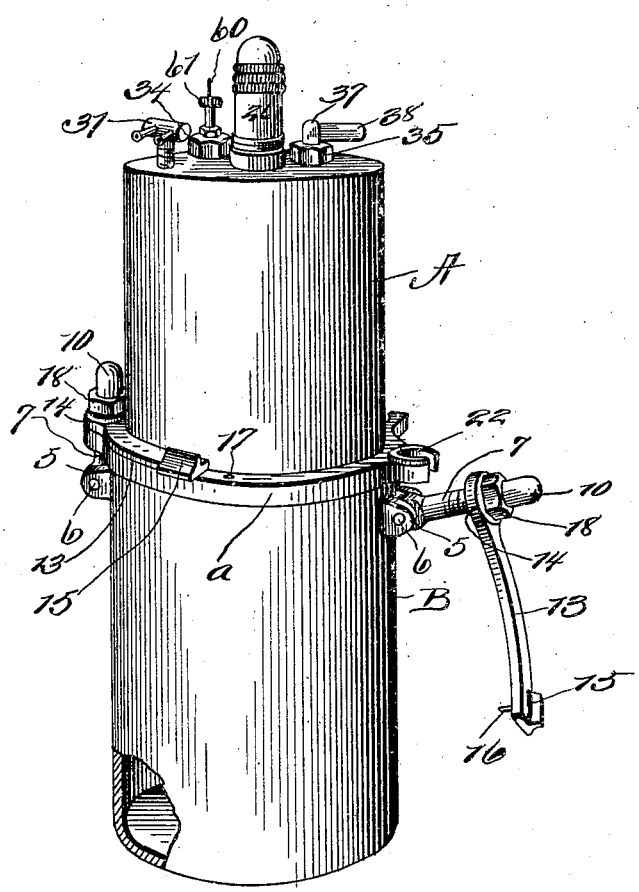
Witnesses
R. A. Boswell.
Dorothy Bodner
Inventor
Octave W. Peterson.
By F. J. Larson & Co.
Attorney

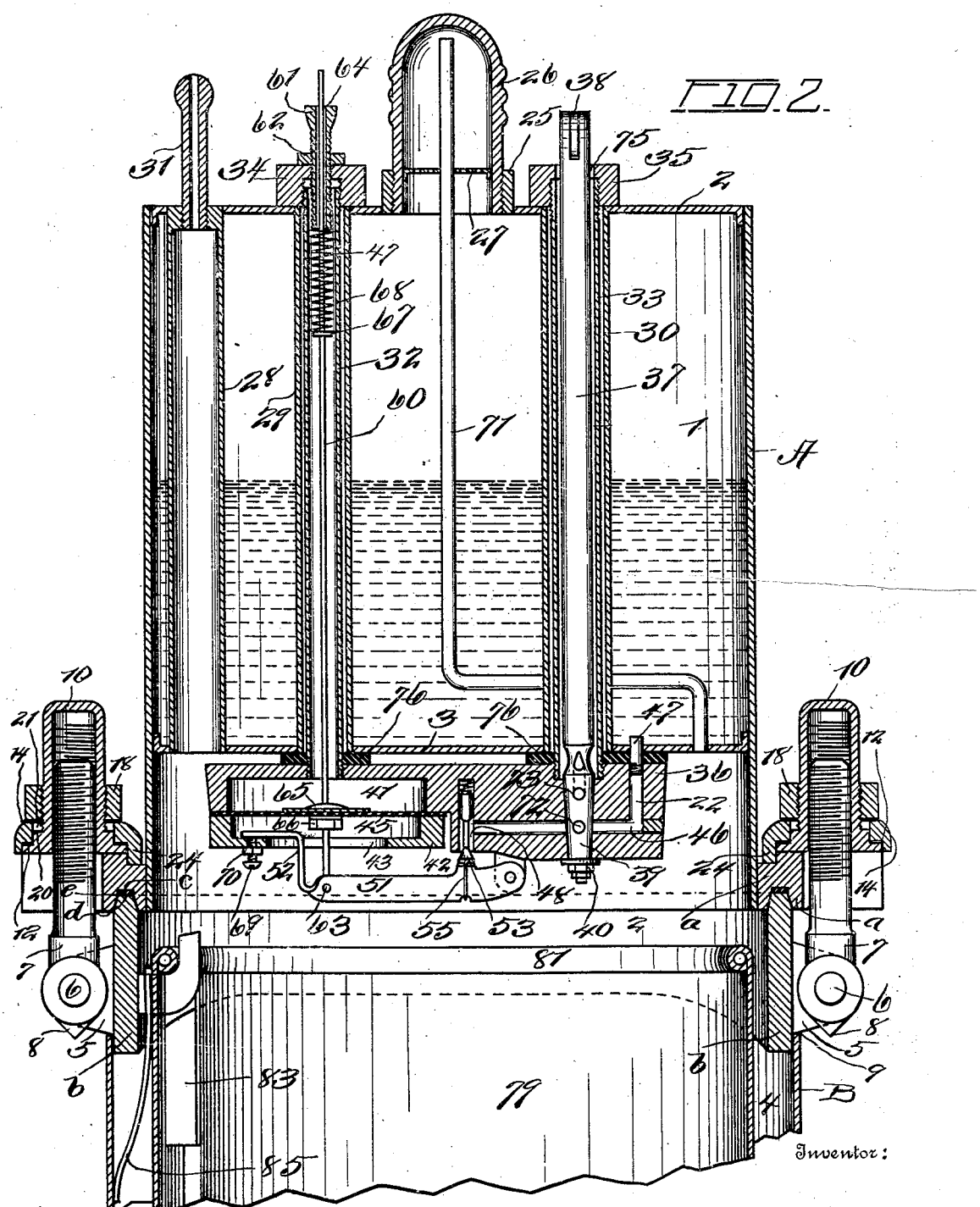

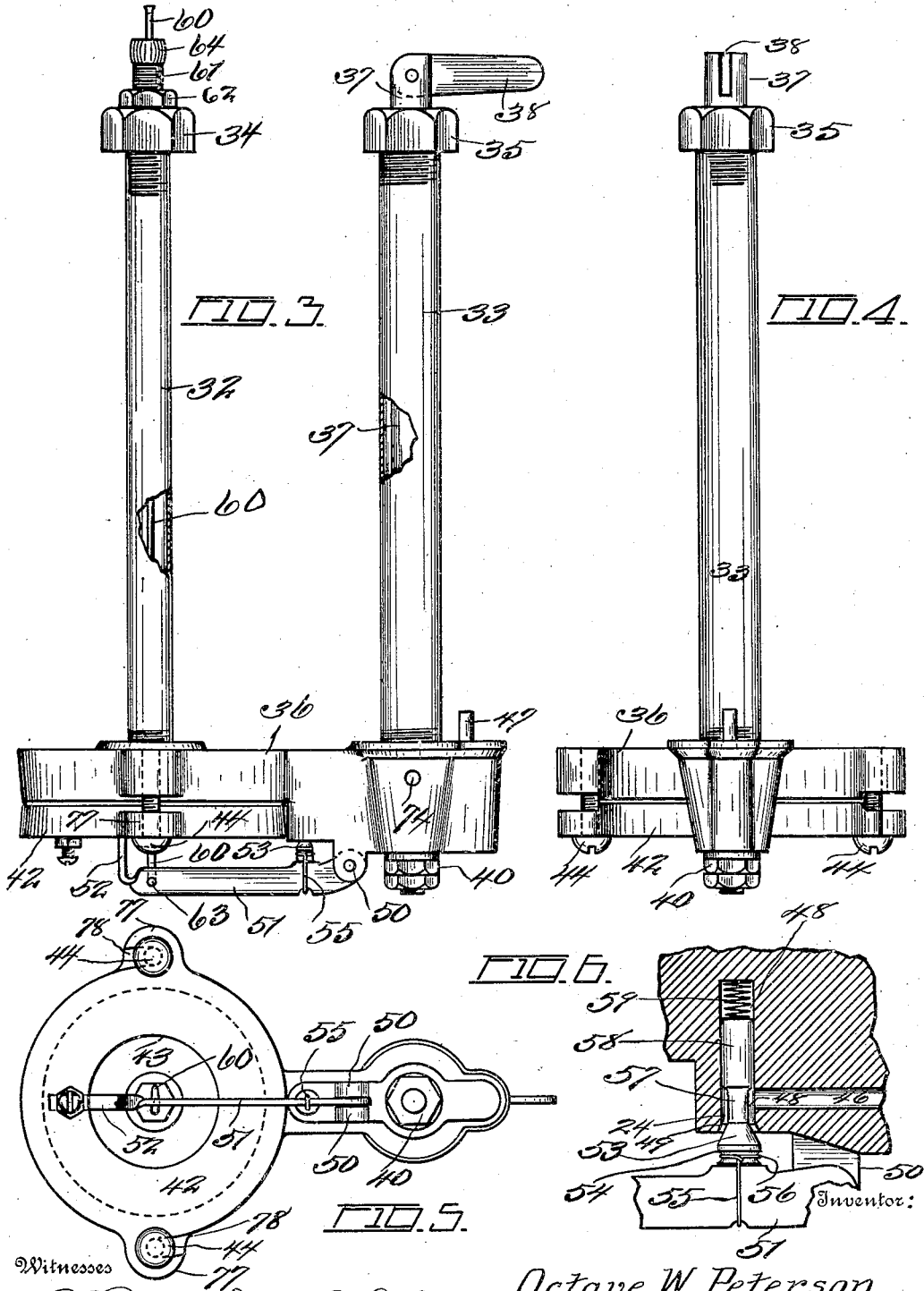

UNITED STATES PATENT OFFICE.

OCTAVE W. PETERSON, OF OMAHA, NEBRASKA.

ACETYLENE-GAS GENERATOR.

945,588. Specification of Letters Patent. Patented Jan. 4, 1910.

Application filed February 2, 1907, Serial No. 355,400. Renewed June 16, 1909. Serial No. 502,446.

*To all whom it may concern:*

Be it known that I, OCTAVE W. PETERSON, a citizen of the United States, residing at Omaha, in the county of Douglas and State of Nebraska, have invented certain new and useful Improvements in Acetylene-Gas Generators, of which the following is a specification.

This invention relates to new and useful improvements in acetylene gas generators and it has particular reference to a generator for use in connection with the lighting systems of automobiles, launches and other isolated structures.

In connection with an apparatus of the above type the invention aims as a primary object to provide a generator in which the parts are self contained and so arranged that their operation will not be interfered with by the jarring due to the movement of the automobile or launch or other vibratory causes.

The invention aims as a further object to provide a generator including novel means for generating gas proportionately to its consumption and at a uniform determinate pressure.

It is a further object of the invention to provide novel means for maintaining a constant feed pressure in the water chamber and for preventing the formation of a vacuum from such causes as freezing or too rapid feeding of the water into the carbid chamber.

The detailed construction will appear in the course of the following description forming a part of this specification, like characters of reference designating similar parts throughout the several views wherein:—

Figure 1 is a perspective view illustrating from the exterior a generator constructed in accordance with my invention. Fig. 2 is a detailed central vertical section thereof partly broken away. Figs. 3 and 4 are detail side and end elevations of the controlling valve and its associate parts. Fig. 5 is a bottom plan view thereof. Fig. 6 is a detailed fragmentary vertical section of an automatic pressure controlled valve for regulating the supply of water to the carbid chamber.

In general terms the invention comprises a water receptacle or chamber and a carbid chamber detachably locked thereto. The water chamber includes in its elements a manually operated valve for initially and directly controlling the supply or feed of water to the carbid chamber, a pressure controlled mechanism and an automatic adjustable valve operated by said mechanism for regulating the supply of water to the carbid chamber in proportion to the consumption of gas and consequent variations of pressure thereof, a branch gas pipe leading from the carbid to the water chamber to prevent the formation of a vacuum in the latter and an auxiliary valve controlled exhaust pipe for blowing off surplus gas when it is desired to immediately extinguish the lamps, without waiting for the gas previously generated to become consumed.

In the practical embodiment of my invention I employ a generator comprising essentially a water receptacle or chamber A, and a carbid receptacle or chamber B. The receptacle A, consists of a cylindrical structure 1, having a top 2, and a false bottom 3. The receptacle B, comprises a cylindrical structure 4, having a bottom and an open top. The receptacle A, is smaller than the receptacle B, so as to fit thereinto and the cylinder 1, of said receptacle A, has at its lower edge a fixed external ring $a$, having in its underneath face an annular groove $c$. The cylinder 4, carries at its upper edge a fixed internal ring $b$ having its upper edge $d$ conformable to the groove $c$ and interfitting the same. The joint thus formed is packed by an annulus $e$ of suitable material. The ring $b$ has cast integral therewith at diametrically opposite points spaced apertured ears 5 which afford bearings for pivot pins 6 to which are fixed respective swing bolts 7 forming elements of the fastening means. The bolts 7 at their lower ends have edged extensions 8 which engage the ring $b$ as stops to limit the downward swinging movement of said bolts.

It will be noted in Fig. 2 that the receptacle 4 is cutaway as at 9 adjacent the outwardly projecting ears 5, caps 10 are threaded upon the bolts 7, said caps at their lower edges having annular flanges 12 which afford seats for curved arms 13. The latter are formed at one end with integral collars 14 surrounding the caps 10 and imposed upon the flanges 12. The arms 13 conform to the curvature of the cylinder 1 and at their adjacent ends are provided with finger pieces 15 by means of which they may be readily swung on the above described swivel joints. On their underneath surface said arms are provided at their adjacent ends with depending studs 16 which enter into recesses 17 provided therefor in the ring $a$. The arms 13 are held in the relation set forth by nuts 18 adjustably mounted upon the threaded outer portions 19 of the caps 10.

By reference to Fig. 8 in which the various elements of the fastening means are shown in detail it will be noted that the flange 12 is provided with a raised central flat sided step 20 and that the collar 14 has a central opening 21 conformable to and surrounding said step in the assembled relation of the parts. The ring $a$ is provided at its opposite sides with bifurcated extensions 22 to receive the bolts 7. Said extensions are also provided with an interrupted annular ledge 23 and collars 14 are each provided with depending semi-annular shoulders 24 which bear against the ledges 23 in partially rotatable relation as swivel bearings to center the arms 13 in their swinging movement and, incidentally as stops to prevent the swinging displacement of the bolts 7 until the arms 13 have been moved to a determinate position at which time the shoulders 24 may swing out of engagement with the ledges 23. The above elements constitute the means for fastening the receptacles A and B to one another.

The space within the receptacle A constitutes a water chamber. The top 2 is provided with a central opening, the wall of said opening being defined by an interiorly threaded collar or boss 25. This central opening affords communication to the interior of the water receptacle for the purpose of filling the same and is normally closed by a dome shaped cap 26 having a spanning sheet of perforate screening material 27.

Between the top 2 and bottom 3 are mounted three vertical fixed tubes 28, 29 and 30. The tube 28 serves as the conductor by which the gas exhausts from the carbid receptacle B, and to this end carries a nipple 31 of suitable construction which projects through the top 2 as is shown in Figs. 1 and 2. Sleeves 32 and 33 are projected through the respective tubes 29 and 30. At their upper end said sleeves are threaded into respective suspension collars 34 and 35 having their lower edges resting on the top 2 and at their lower ends said sleeves are threaded into communicating openings in a casting 36. A valve stem 37 is projected through the sleeve 33 and through the collar 35 said valve stem at its upper end having a swinging hand lever 38 and at its lower end a frusto conical valve head 39 rotatably mounted in a comfortable seat provided therefor in the casting 36. Lock nuts 40 are threaded upon the reduced projecting lower end of the valve head 39 and serve to prevent upward displacement of the same, such as would naturally occur from vibration or careless manipulation. At the end opposite to the valve 39, the casting 36 is enlarged and formed with a circular recess 41. Adjacent said recess the casting is of reduced thickness and carries on its underneath surface a flanged annulus 42 having a central opening 43 concentric with the recess 41. The annulus 42 being held fixed by securing screws 44 threaded into the casting 36 as shown in Fig. 4. Said annulus co-acts with the casting 36 to afford a clamping means for a flexible diaphragm 45, of material readily susceptible to pressure.

The casting 36 is provided at one end with an angular passage 46, into which is threaded a short length tube 47, projecting slightly into the receptacle A. At its other end said passage communicates with a vertical bore 48, open to the receptacle B. The casting 36 is provided adjacent said bore with depending ears 50, between which is pivoted a lever 51. The lever 51 has one end bent to form an angular finger 52, overhanging the flanged portion of the annulus 42. The bore 48 has a conical or flaring lower end 49 which constitutes a seat for cone shaped valve 53. The valve 53 and its associated parts are illustrated in detail in Fig. 6. Said valve is provided below its bearing surface with a groove 54. A tie 55 is employed to fix the valve 53 to the lever 51 and to this end said tie is constructed of flexible non-corrosive wire which is looped about said groove as at 56 so as to become frictionally and positively engaged with said valve 53 against displacement. Said valve has a reduced axial extension 57, projecting into and working in the bore 48, said extension terminating in an enlarged bearing head 58. An expansive coil spring 59 is interposed between the head 58 and the end of the bore 48, the function of said spring being to insure the instantaneous displacement of the valve 53 from its seat 49 under circumstances to be hereinafter set forth.

A rod or stem 60 is projected through the sleeve 32 and likewise through a short length adjusting sleeve 61 having a knurled head 64 and threaded concentrically through the collar 34, a lock nut 62 being employed to fix the sleeve 61 at any selected position to which it may be adjustably set. The stem 60 is also passed through the center of the diaphragm 45 and at its lower end is pivoted as at 63 to the lever 51 adjacent the finger 52 thereof. The stem 60 adjacent the diaphragm 45 carries fixed bearing plate 65 imposed upon said diaphragm and on the opposite side of the diaphragm a nut 66 for taking up play by binding said diaphragm against said plate. The stem 60 carries at a point distant from the lower end of the sleeve 61 a stop 67, against which bears one end of an expansion coil spring 68, surrounding said stem and interposed between the stop 67 and the sleeve 61. An adjusting screw 69 is threaded through the flange of the annulus 42 and a lock nut 70 is threaded upon said screw and serves to fix the same at any position at which it may be set.

An angular tube 71 has its one end fixed in the bottom 3 and open to the receptacle B and its other end projects through the sheet 27 and into the cap 26 to a point slightly short of the top thereof. A small percentage of the gas in the receptacle B passes through the tube 71 and into the receptacle A, exerting a pressure therein which causes a uniform feed of the water therefrom and which prevents the formation of a vacuum for the reason previously stated.

The valve head 39 is formed with a lower opening 72 which is designed in one position of said valve to register with the passage 46, and with an upper angular opening 73, which communicates with the interior of the sleeve 33 and which when said valve is in position to close the passage 46, registers with an opening 74 (Fig. 3) provided in the surrounding material of the casting 36 and open to the receptacle B. It will be noted in Fig. 2 that the opening 75 in the collar 35, is of considerably greater diameter than the valve stem 37 projected therethrough whereby in the position of the valve 32 illustrated in Fig. 2 a free passage is afforded through the sleeve 33 to the outside atmosphere to permit of the egress from the receptacle B of the surplus gas in order that the lamps may be instantly extinguished.

It will be noted that packing gaskets 76 surround the sleeves 32 and 33 and are interposed between the casting 36 and the bottom of the receptacle A. Another important detail of construction appears in Fig. 5 in which the annulus 42 is shown as having oppositely disposed extension 77 having oppositely extending tangential recesses 78 within which the screws 44 are received. When said screws are loosened the annulus 42 may be disengaged therefrom by a partial rotatory movement in the proper direction as will be readily apparent.

A suitable carbid basket 79 illustrated in Figs. 2 and 9 is suspended within the receptacle B.

In practical use the receptacle A, is filled with water through the opening normally closed by the cap 26. The top 2, is suitably marked to indicate the various positions to which the valve 39 may be moved, such designations being arranged at proper intervals about the lever 38 as a radius and reading respectively "On", "Off", and "Out", The receptacle A, is removed from the receptacle B, and the basket 79, of the latter filled with carbid, at which time the receptacle A, is imposed and locked upon the receptacle B, by the means described. The stem 37 is then rotated by the lever 38 until said lever points as an indicator to the word "On", at which time the valve 39 will be in a position where its opening 72 registers with the passage 46. The water then flows through the tube 47 passage 46 and bore 48 from which it drops continuously on the carbid contained in the basket 79. The valve 53 is adjustably positioned with relation to its seat so as to increase or decrease the size of the water discharge opening by means of the screw 69, which, upon being moved in the proper direction raises or lowers the lever 61, and consequently the valve 53, as desired.

The pressure at which the gas in the receptacle B, acts upon the diaphragm 45 to raise the same and consequently through the connections described to close the valve 53 and automatically shut off the supply of water is determined by rotating the sleeve 61 to increase or decrease the extension of the spring 68 engaging the stem 60, which as has been set forth is positively connected to the diaphragm 45. Said spring 68 normally tends to keep said diaphragm in its lowermost position with the valve 53 consequently open. The gas from the receptacle B, passes through the tube 28 to the lighting system.

When it is desired to shut off the supply of water but at the same time to permit of burning the gas previously generated, the valve 39, is rotated until the indicating lever 38 points to the word "Off" at which time the position of the said valve is such that the opening 72 is wholly out of register with the passage 46 and the opening 73 is out of register with the opening 74. Movement of the valve 39 to a position where its indicating lever points to the word "Out" results in maintaining the non-registering relation of the opening 72 and passage 46, but in bringing the opening 73 into register with the opening 74, at which time the surplus gas in the receptacle B, passes through the opening 74 and 73, and sleeve 33, as a conductor as previously detailed, exhausting into the atmosphere. The supply of gas to the lighting system is thus stopped and the lights instantly die out.

The diaphragm 27 in the cap 26, in addition to screening extraneous matter from the gas passing into the receptacle A, serves to prevent the water from splashing into the tube 71, and sealing the gas therein or flowing down into the receptacle B, and causing generation above the normal determinate degree.

It will be obvious that when, for any reason the pressure in the receptacle B, falls below normal, the spring 68 will exert its force or lower the diaphragm 45. The valve 53 will consequently be moved to permit an increased feed of water. On the other hand, too great a pressure will counteract the tension of the spring and raise the diaphragm to close the valve 53 and shut off the supply of water until the consumption reduces the pressure to a normal degree, at which time the opposed forces will be balanced and the valve 53, lies in its determinate open position. The various detachable connections permit of ready access to the inclosed parts for the purposes of renewal or repair.

Having fully described my invention, I claim:—

1. A gas generator comprising a carbid receptacle, a water receptacle imposed thereon, a casting fixed above said carbid receptacle, said casting having a circular recess, a flexible diaphragm spanning said recess, said casting also having a passage located to one side of said diaphragm and communicating at its ends with each of said receptacles, a stem depending from said diaphragm and fixed thereto, a lever pivoted at one end to said casting and at the other end to said stem, and a valve fixed to said lever and controlling the discharge orifice of said passage.

2. A gas generator comprising a carbid receptacle, a water receptacle imposed thereon, a sleeve 32 extending through said water receptacle, a casting 36 fixed to the lower end of said sleeve above said carbid receptacle, said casting having an opening therethrough and communicating with said sleeve, a flexible diaphragm spanning said opening, a stem projecting through said sleeve and said diaphragm, said stem having fixed connection to said diaphragm, said casting also having a passage communicating at its ends with each of said receptacles, an automatic valve for controlling the discharge orifice of said passage, operative connections between said stem and said valve, an adjusting sleeve 61 extending into said sleeve and extending above the top of the water receptacle, a stop on said stem and an expansive coil spring interposed between said stop and said adjusting sleeve.

3. A gas generator comprising a carbid receptacle, a water receptacle imposed thereon, a casting fixed above said carbid receptacle, said casting having a circular recess, a flexible diaphragm spanning said recess, said casting also having a passage located to one side of said diaphragm and communicating at its lower ends with each of said receptacles, a stem depending from said diaphragm and fixed thereto, an automatic valve for controlling the discharge orifice of said passage, operative connections between said stem and said valve, a manually operated valve mounted in said casting, and having a port designed in one position to wholly register with said passage, and a means extending above the water receptacle to operate said valve.

4. A gas generator comprising a carbid receptacle, a water receptacle imposed thereon, a single casting fixed above said carbid receptacle, said casting having a circular recess, a flexible diaphragm spanning said recess, said casting also having a passage located to one side of said diaphragm and having right angular ends communicating with each of said receptacles, a stem depending from said diaphragm and fixed thereto, an automatic valve for controlling the discharge orifice of said passage, operative connections between said stem and said valve, and means for adjustably positioning said valve with relation to said discharge orifice.

5. A gas generator comprising a carbid receptacle, a water receptacle imposed thereon, a casting fixed above said carbid receptacle, a flanged annulus secured thereto and having a central opening and an inwardly extending flange, a flexible diaphragm spanning said opening, said casting having a passage communicating at its ends with each of said receptacles, a stem depending from said diaphragm and fixed thereto, a lever pivoted at one end to the under face of said casting, and at its other end of said stem, said lever having an extended finger overlying said flange, a valve fixed to said lever and controlling the discharge orifice of said passage, and an adjusting screw threaded through said flange and engaging said finger.

6. A gas generator comprising a carbid receptacle, a water receptacle imposed thereon, a casting fixed above said carbid receptacle, said casting having a circular recess, a flexible diaphragm spanning said recess, said casting also having a passage communicating at its ends with each of said receptacles, a stem depending from said diaphragm and fixed thereto, an automatic valve for controlling the discharge orifice of said passage, operative connections between said stem and said valve, carried on the under face of said casting, means for adjustably positioning said valve with relation to said discharge orifice, and means located above said water receptacle for adjusting the tension of said diaphragm.

7. A gas generator comprising a carbid receptacle, a water receptacle imposed thereon, a casting fixed above said carbid receptacle, said casting having a circular recess, a flexible diaphragm spanning said recess, said casting also having a passage communicating at its ends with each of said receptacles, a stem depending from said diaphragm and fixed thereto, an automatic valve for controlling the discharge orifice of said passage, operative connections between said stem and said valve carried on the under face of said casting, and an adjustable spring confined in a chamber provided therefor in said casting acting upon said valve and tending to move the same away from said discharge orifice.

8. A gas generator comprising a carbid receptacle, and a water receptacle, having valve controlled communication therewith, said water receptacle also having an opening in the top thereof, and a dome shaped cap closing said opening, a sheet of screening material spanning said cap, a discharge conductor leading from said carbid receptacle, and a tube communicating at one end with said carbid receptacle, and at its other end with said water receptacle, said tube being projected upwardly through said screening sheet to a point short of the top of said cap.

9. A gas generator comprising a carbid receptacle, a water receptacle arranged thereabove, tubes projecting through and beyond said water receptacle, collars carried at the upper ends of said respective tubes, and resting upon the top of said water receptacles, a casting fixed to the lower ends of said tubes and controlling mechanism associated with said casting.

10. A gas generator embodying a carbid receptacle, a water receptacle imposed thereon, a vertical tube extending through the top and bottom of said water receptacle, a sleeve arranged within said tube and having threaded ends which project above and below the top and bottom respectively of the water receptacle, a casting secured to the lower end of said sleeve and rigidly held thereby against the bottom of the water receptacle, a nut secured to the upper end of said sleeve, and bearing against the upper face of the water receptacle, said casting having a port communicating with the carbid and water receptacle, and means to control said port.

11. A gas generator embodying a carbid receptacle, a water receptacle thereon, a casting at the top of the carbid receptacle having a circular recess and a passage leading into each of said receptacles, a diaphragm spanning said recess, a valve controlling said passage, a lever pivoted at one end to the casting and having its opposite end free, adjustable means to engage said free end of the lever and restrain its movement, and a connection between said diaphragm and said lever.

12. A gas generator embodying a carbid receptacle, a water receptacle thereon, a casting carried on the under face of said water receptacle, said casting having a diaphragm chamber formed on its under face at one end thereof, a diaphragm extending across said chamber, a flanged member engaging said diaphragm and secured to said casting, said casting at its other end being formed with a passage having angular ends one of which extends through the top of the casting and the other of which extends through the bottom thereof, a valve controlling the lower end of said passage, a lever pivoted at one end to the under face of said casting and having a right angular free end which overlies said flange, said lever being connected to said valve and diaphragm, and a set screw extending through said flange to have upper end engaged by said right angular end of the lever.

13. A gas generator comprising a carbid receptacle, a water receptacle thereon, a pair of spaced sleeves each having its upper end extending above the top of the water receptacle and having its lower end extending below the bottom of said water receptacle, a suspension collar threaded onto the upper end of each of said sleeves, a casting underlying the bottom of the water receptacle, said lower ends of each of said sleeves being threaded into engagement with said casting to support the same, said casting being formed with a diaphragm chamber underlying one of said sleeves and with a passage which has its ends communicating with each of the receptacle and having an intermediate part underlying the other of said sleeves, a diaphragm in said chamber, means operated by the diaphragm for controlling the discharge of water into said carbid receptacle, a stem secured to said diaphragm extending through the first sleeve and beyond the top of the water receptacle, spring pressed adjustable means for said stem, and a valve stem projected through said second sleeve carrying a valve which is located in said intermediate portion of said casting passage, said valve stem at its upper end extending beyond the top of the water receptacle so as to be manually operated thereabove.

14. In a gas generator, a carbid receptacle, a water receptacle thereon, a casting having a passage leading into each receptacle and a diaphragm chamber, formed therein, said chamber and passage being in side by side relation, a diaphragm in said chamber, a valve in said passage, means carried by the casting to connect said valve and diaphragm, and means extending through the water receptacle and supported from the top face of the same for removably sustaining said casting in position.

In testimony whereof I affix my signature in presence of two witnesses.

OCTAVE W. PETERSON.

Witnesses:
DAN. J. RILEY,
J. J. PETERSON.